United States Patent Office 3,324,191
Patented June 6, 1967

3,324,191
POLYMERIZATION PROCESS
Clinton F. Wofford, Bartlesville, Okla., assignor to Phillips Petroleum Company, a corporation of Delaware
No Drawing. Filed Nov. 16, 1964, Ser. No. 411,618
12 Claims. (Cl. 260—669)

This invention relates to a process for the polymerization of olefinic compounds. In one aspect this invention relates to the polymerization of conjugated dienes alone or in admixture with other conjugated dienes or vinyl-substituted aromatic compounds. In another aspect this invention relates to a process for the formation of liquid polymer products by carrying out the polymerization in the presence of a polar material. A still further aspect of the invention relates to the formation of liquid polymers at relatively low concentrations of organolithium initiators.

It is known that organolithium compounds can be utilized as catalysts for the polymerization of conjugated dienes, either alone or with copolymerizable monomers such as vinyl-substituted aromatic hydrocarbons. Other types of organometallic compounds have also been employed for the polymerization of conjugated dienes. It is common practice to regulate the molecular weight of such polymers by suitable adjustment of catalyst concentration. As the catalyst level is increased the molecular weight of the polymer is decreased. When it is desired to prepare liquid polymers, very high catalyst levels are generally required.

Accordingly, it is an object of the present invention to form polymers of decreased molecular weight in a manner to avoid increase of catalyst level in the system. Another object of the invention is to provide a novel catalyst system for preparing conjugated diene polymers.

Other aspects, objects and the several advantages of the invention will be apparent to those skilled in the art from the following discussion and the appended claims.

I have now discovered in accordance with the present invention a novel process and catalyst system for the preparation of polymers of conjugated dienes. The catalyst can be employed in the polymerization of conjugated dienes alone or in admixture with vinyl-substituted aromatic hydrocarbons. Broadly speaking, the polymerization process of this invention comprises the step of contacting in a polymerization zone a conjugated diene, either alone or in admixture with another conjugated diene or a vinyl-substituted aromatic hydrocarbon, with a catalyst which forms on mixing (1) an organolithium compound, (2) an organic compound of sodium, potassium, rubidium or cesium, and (3) a polar material selected from the group consisting of oxygen, water, alcohols, primary amines, and secondary amines and conducting the polymerization in the presence of a diluent comprising at least 30 weight percent of an alkyl-substituted aromatic hydrocarbon. The polar material provides a means for lowering molecular weight and through its use a much lower concentration of organolithium compound can be employed than is otherwise required for the production of a specified type of polymer. Thus through the use of a polar material, catalyst systems are provided which have an advantage from an economical standpoint.

One of the main advantages of this invention is that it provides a process for preparing liquid conjugated diene polymers, such as liquid polybutadiene and liquid polyisoprene, as well as liquid random copolymers of butadiene or isoprene with styrene, without the necessity for using excessive amounts of catalyst. By process of this invention liquid polymers of very low molecular weight can be easily prepared when the concentration of the organolithium component charged to the polymerization is no greater than is frequently utilized for the production of rubbery polymers. Since there are generally small amounts of impurities in the diluent and/or monomer(s), a portion of the organolithium compound serves as a scavenger with the remainder being utilized as an active initiator component.

Organolithium compounds employed in preparing the catalyst of this invention correspond to the formula $R(Li)_x$ wherein R is a hydrocarbon radical selected from the group consisting of aliphatic, cycloaliphatic and aromatic radicals, and $x$ is an integer from 1 to 4, inclusive. The R in the formula preferably contains from 1 to 20 carbon atoms, although it is within the scope of the invention to use higher molecular weight compounds. Examples of organolithium compounds which can be used include methyllithium, isopropyllithium,
n-butyllithium, sec-butyllithium,
tert-octyllithium, n-decyllithium,
phenyllithium, naphthyllithium,
4-butylphenyllithium, p-tolyllithium,
4-phenylbutyllithium,
cyclohexyllithium, 4-butylcyclohexyllithium,
4-cyclohexylbutyllithium, dilithiomethane,
1,4-dilithiobutane, 1,10-dilithiodecane,
1,20-dilithioeicosane, 1,4-dilithiocyclohexane,
1,4-dilithio-2-butene, 1,8-dilithio-3-decene,
1,4-dilithiobenzene, 1,2-dilithio-1,2-diphenylethane,
1,2-dilithio-1,8-diphenyloctane, 1,3,5-trilithiopentane,
1,5,15-trilithioeicosane, 1,3,5-trilithiocyclohexane,
1,3,5,8-tetralithiodecane, 1,5,10,20-tetralithioeicosane,
1,2,4,6-tetralithiocyclohexane, 4,4'-dilithiobiphenyl, and the like.

As mentioned above, the second component employed in preparing the present catalyst is an organic compound of sodium, potassium, rubidium or cesium. These compounds are selected from the group consisting of compounds having the following formulas:

(1) R'M
(2) R'(YM)ₐ
(3) 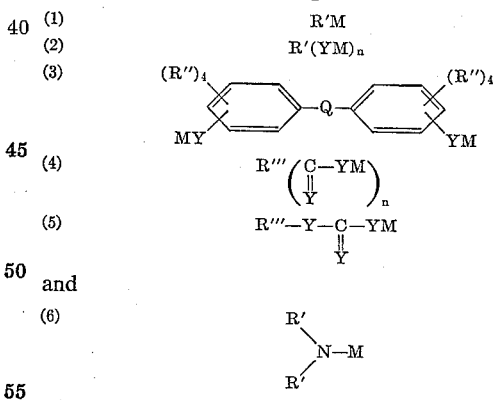
(4) $R'''\left(\begin{array}{c}C-YM\\\|\\Y\end{array}\right)_n$
(5) $R'''-Y-\underset{\|}{\underset{Y}{C}}-YM$ and (6) $\begin{array}{c}R'\\ \diagdown\\ \quad N-M\\ \diagup\\ R'\end{array}$ wherein R' is selected from the group consisting of aliphatic, cycloaliphatic and aromatic radicals, preferably containing from 1 to 20 carbon atoms, M is an alkali metal selected from the group consisting of sodium, potassium, rubidium and cesium, R" is selected from the group consisting of hydrogen and aliphatic, cycloaliphatic and aromatic radicals, preferably containing from 1 to 6 carbon atoms, Q is selected from the group consisting of

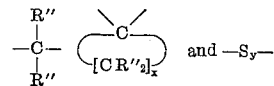 and $-S_y-$ radicals, where R" is as defined before, $x$ is an integer from 4 to 5, inclusive, and $y$ is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur, and $n$ is an integer from 1 to 3, inclusive. It is to be understood that the aliphatic and cycloaliphatic radicals mentioned above be saturated or unsaturated.

Examples of organometal compounds corresponding to Formula 1 include the following:

methylsodium, ethylpotassium,
n-propylrubidium, isopropylcesium,
tert-butylsodium, tert-amylsodium,
n-hexylpotassium, cyclohexylrubidium,
eicosylcesium, 4-methylcyclohexylsodium,
3-hexenylsodium, 2,5-decadienylpotassium,
3-cyclopentenylrubidium,
4,6-di-n-butyldecylsodium,
3,6-diphenyloctylpotassium,
phenylsodium, 1-naphthylpotassium,
4-tolylpotassium, benzylsodium,
4-tert-butyl-6,7-diisopropyl-2-naphthylpotassium, and the like.

Formulas 2 and 3 define the alkali metal salts of mono- and polyhydric alcohols, mono- and polyhydric phenols, including bis-phenols, and sulfur analogs of the foregoing, that can be used in preparing the present catalyst system. Specific examples of compounds represented by Formula 2 include the sodium, potassium, rubidium and cesium salts of methyl alcohol, ethyl alcohol, n-propyl alcohol,
isopropyl alcohol, tert-butyl alcohol,
tert-amyl alcohol, n-hexyl alcohol,
cyclohexyl alcohol, eicosyl alcohol,
2-butenyl alcohol, 4-methylcyclohexyl alcohol,
3-hexenyl alcohol, 2,5-decadienyl alcohol,
3-cyclopentenyl alcohol, 4,6-di-n-butyldecyl alcohol,
4,8-dodecadienyl alcohol, allyl alcohol,
1,3-dihydroxyhexane, 1,5,9-trihydroxytridecane,
1,6-dihydroxyoctane, 1,9,15-trihydroxypentadecane,
benzyl alcohol, 3(4-tolyl)propyl alcohol,
phenol, catechol, resorcinol, hydroquinone,
pyrogallol, 1-naphthol, 2-naphthol,
2,6-di-tert-butyl-4-methylphenol (Ionol),
2,4,6-tri-tert-butylphenol,
2,6-di-tert-butyl-4-phenylphenol,
2,6-di-sec-butyl-4-methylphenol,
ethanethiol, 1-butanethiol,
2-pentanethiol, 2-isobutanethiol,
benzenethiol (thiophenol), 1,12-dodecanedithiol,
5,9-di-n-propyl-1,14-tetradecanedithiol,
2-naphthalenethiol, cyclohexanethiol,
2,5-di-n-hexyl-6-tert-butylbenzenethiol,
2,6-di-tert-butyl-4(4-tolyl)benzenethiol,
3-methylcyclohexanethiol, 2-naphthalenethiol,
benzenemethanethiol, 2-naphthalenemethanethiol,
1,8-octanedithiol, 1,10-decanedithiol,
1,4-benzenedithiol, and the like.

Specific examples of suitable compounds corresponding to Formula 3 are the sodium, potassium, rubidium and cesium salts of 2,2'-methylene-bis(4-methyl-6-tert-butylphenol),
2,2'-isopropylidene-bis(6-cyclohexyl-p-cresol),
4,4'-isopropylidene-bis(2,6-dicyclohexylphenol),
4,4'-methylene-bis(2,6-diisopropylphenol),
2,2'-methylene-bis(6-benzyl-p-cresol),
2,2'-ethylidene-bis(5-isopropylphenol),
1,1-bis(4-hydroxyphenyl)cyclohexane,
1,1-bis[2-hydroxy-3-(3-tolyl)]-cyclopentane,
2,2'-ethylidene-bis(4-ethyl-6-tert-hexylthiophenol),
2,2'-propylidene-bis(3,5-dimethyl-6-cyclopentylthiophenol),
4,4'-thio-bis(2,6-di-tert-butylphenol),
4,4'-dithio-bis(2-n-propyl-6-tert-butylphenol),
4,4'-trithio-bis(2-methyl-6-isopropylphenol), and the like.

Specific examples of the alkali metal salts of mono- and polycarboxy acids and sulfur analogs as represented by Formula 4 include the sodium, potassium, rubidium and cesium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, hendecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthaleneacrylic acid, hexanethionic acid, 2,2-diethylbutanethiolic acid, decanethionic acid, tridecanethionothiolic acid, 4-tetradecenethionic acid, thiolbenzoic acid, thiono-1-naphthoic acid, and the like.

Specific examples of alkali metal carbonates and sulfur analogs as represented by Formula 5 include the sodium, potassium, rubidium and cesium salts of tert-butylcarbonic acid, n-hexylcarbonic acid, 3,5-dimethylhexylcarbonic acid, n-dodecylcarbonic acid, 4,4-diethylhexylcarbonic acid, 3,6-diphenyloctylcarbonic acid, 7-dodecenylcarbonic acid, 3-cyclohexenylcarbonic acid, phenylcarbonic acid, O-tert-amyl ester of thiolcarbonic acid, O-tridecyl ester of thionocarbonic acid O-eicosyl ester of thionothiocarbonic acid (xanthic acid), S-hexadecyl ester of dithiolcarbonic acid, S-(3-cyclohexenyl) ester of thiolcarbonic acid, phenyl ester of trithiocarbonic acid, and the like.

Specific examples of alkali metal salts of secondary amines as represented by Formula 6 include the sodium, potassium, rubidium and cesium salts of dimethylamine, di-n-butylamine, methyl-n-hexylamine, di(3,5-diethyloctyl)amine, di(8-phenyloctyl)amine, di(3-hexenyl)amine, diphenylamine, dibenzylamine, ethyl-4-tolylamine, n-propyl-n-eicosylamine, and the like.

It is to be understood that any one or more of the organic compounds of sodium, potassium, rubidium and cesium as represented by the formulas can be used with one or more of the $R(Li)_x$ compounds in forming the present catalyst system. Alkali metal derivatives of compounds having mixed functionality can also be employed with the $R(Li)_x$ compounds. Examples of such derivatives include the sodium, potassium, rubidium and cesium salts of 10-hydroxydecanoic acid, 8-mercapto-1-naphthoic acid, 1-hydroxy-14-mercapto-8-tetradecene, 1-hydroxy-9-mercaptopentadecanoic acid, 2-tert-butyl-6-mercapto-1-naphthoic acid, and the like.

The polar materials employed include oxygen, water, alchohols and primary and secondary amines. The alcohols and amines generally contain from 1 to 20 carbon atoms per molecule, although compounds outside this range can be used if desired. Examples of these compounds are: methyl alcohol, ethyl alcohol, isopropyl alcohol, n-butyl alcohol, tert-amyl alcohol, n-hexyl alcohol, cyclohexanol, n-octyl alcohol, n-decyl alcohol, lauryl alcohol, myristyl alcohol, stearyl alcohol, benzyl alcohol, methylamine, n-propylamine, sec-butylamine, n-amylamine, tert-nonylamine, n-decylamine, tert-hexadecylamine, n-eicosylamine, dimethylamine, methyl-n-butylamine, di-n-decylamine, di-n-tridecylamine, methyl-n-eicosylamine, diphenylamine, dicyclohexylamine, dibenzylamine, di(4-tolyl)amine, methyl(phenyl)amine, and n-propyl-(4-methylcyclohexyl)amine.

The amount of the organolithium compound employed in forming the catalyst system will generally be in the range of 0.3 to 25 milliequivalents per 100 parts of total monomers charged (e.g., gram milliequivalents per 100 grams of total monomers charged) with from 0.6 to 10 milliequivalents of organolithium compound per 100 parts by weight of monomers being preferred. In many instances an amount of organolithium compound less than 2 gram milliequivalents per 100 grams of monomers charged gives the desired results. The quantity is determined by the organolithium compound and the other alkali metal organic compound used, the amount of polar compound, and the diluent.

The relative quantities of organolithium compounds and the organic compounds of sodium, potassium, rubidium and cesium can vary over a rather broad range. The amount of the organolithium compound will generally be in the range of 0.25 to 25 equivalents (based on lithium atoms) per equivalent of the organic compound of sodium, potassium, rubidium or cesium.

The quantity of polar material is based on the organolithium compound and will generally be in the range of 0.05 to 0.7 moles per gram atom of lithium.

The alkyl-substituted aromatic hydrocarbons preferred as diluents are the alkyl-substituted benzenes containing from 1 to 4 alkyl groups per molecule with the total number of carbon atoms in the alkyl groups not to exceed 8. Examples of these compounds include toluene, xylenes, 1,2,3-trimethylbenzene, 1,2,4-trimethylbenzene, 1,3,5-trimethylbenzene, 1,2,4,5 - tetramethylbenzene, 1-methyl-2-ethylbenzene, 2,4-diethylbenzene, ethylbenzene, isopropylbenzene, 1,4-di-n-propylbenzene, 1,4-dimethyl - 3 - isopropylbenzene, 1-ethyl-2,5-di-n-propylbenzene, tert-butylbenzene, n - butylbenzene, 1,3-di-n-butylbenzene, amylbenzene, 1 - amyl-2-isopropylbenzene, 1,2-dimethyl-4-n-hexylbenzene, and n-octylbenzene. As hereinbefore stated, the alkyl-substituted aromatic hydrocarbon can serve as the total diluent or it can be employed in admixture with aliphatic and cycloaliphatic hydrocarbon diluents. Examples of such diluents include propane, isobutane, n-pentane, isooctane, n-dodecane, cyclopentane, cyclohexane, methylcyclohexane, benzene, toluene, xylene, ethylbenzene, and the like. In the case of mixed diluents, at least 30 weight percent of the mixture is the alkyl-substituted hydrocarbon. As the quantity of alkyl-substituted aromatic hydrocarbon in the diluent mixture is increased, the molecular weight of the polymer is decreased. While this invention is not based upon any particular reaction mechanism, it is believed that the alkyl-substituted aromatic hydrocarbon functions as a chain transfer agent and thereby makes possible the production of low molecular weight polymers.

Monomers that can be polymerized in accordance with the present process are slected from the group consisting of (1) at least one conjugated diene and (2) a mixture of conjugated dienes and vinyl-substituted aromatic hydrocarbons. Conjugated dienes that can be used preferably contain from 4 to 12 carbon atoms per molecule and include 1,3-butadiene, isoprene, 1,3-pentadiene, 2,3- dimethyl-1,3-pentadiene, 2,3 - dimethyl - 1,3-pentadiene, 2-phenyl-1,3-butadiene, and 4,5-diethyl-1,3-octadiene. The vinyl-substituted aromatic hydrocarbons that can be employed include any vinyl-substituted aromatic hydrocarbon in which the vinyl group is attached to a nuclear carbon atom. It is to be understood that a compound having a substituent on the alpha carbon atoms, such as alpha-methylstyrene, is not applicable to the practice of the instant invention. Examples of vinyl-substituted aromatic hydrocarbons which are often preferred are the styrene, 1-vinylnaphthalene and 3-methylstyrene (3-vinyltoluene). Examples of other compounds which can be advantageously utilized include 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-toylstyrene, 3,5-diphenylstyrene, 2,3,4,5 - tetraethylstyrene, 3 - (4-n-hexylphenyl)styrene, 3-ethyl-1-vinylnaphthalene, 6-isopropyl-1-vinylnaphthalene, 3,6-di-p-tolyl-1-vinylnaphthalene, 6-cyclohexyl-1-vinylnaphthalene, 8-phenyl-1-vinylnaphthalene, 7-dodecyl-2-vinylnaphalene, and the like.

The amount of conjugated diene and vinyl-substituted aromatic hydrocarbon employed in the preparation of the completely random copolymers can vary over a rather wide range, e.g. from 50 to 95 parts by weight of conjugated diene and from 50 to 5 parts by weight of vinyl-substituted aromatic hydrocarbon, both based on 100 parts by weight of total monomers. It is to be understood that mixtures of conjugated dienes as well as mixtures of the vinyl-substituted aromatic hydrocarbons can be utilized in preparing the random copolymers.

The polymerization process of this invention can be carried out at any temperature within the range of about −80 to 150° C., but it is preferred to operate in the range of −20 to 80° C. The polymerization reaction can be carried out under autogenous pressures. It is usually desirable to operate at a pressure sufficient to maintain the monomeric materials substantially in the liquid phase. The pressure will thus depend upon the particular materials being polymerized, the diluent employed, and the temperature at which the polymerization is carried out. However, higher pressures can be employed if desired, these pressures being obtained by some such suitable method as the pressurization of the reactor with a gas which is inert with respect to the polymerization reaction.

The process of this invention can be carried out as a batch process by utilizing any suitable charging procedure, e.g. by charging the monomeric material into a reactor containing the catalyst and the diluent. In another method, the two catalyst components are charged separately to the reactor, either prior to or subsequent to the addition of the monomeric material and/or the diluent. It is also within the scope of the invention to preform the catalyst by mixing the two catalyst components in a liquid hydrocarbon, preferably the same as the polymerization diluent. It is also frequently advantageous to age the catalyst, particularly when the second component, i.e., the sodium, potassium, rubidium or cesium compound, is not readily soluble in the liquid hydrocarbon. In such cases, optimum results are obtained by aging the mixture at a temperature in the range of about 25° C. to 150° C. The aging time depends upon the temperature used and the solubility of the second catalyst component, but it is usually in the range of about 5 minutes to about 8 minutes. In many instances, the aging time is in the range of 1 to 100 hours, but times as long as 6 to 8 months can be utilized. The process can also be practiced in a continuous manner by maintaining the above-described concentrations of reactants in the reactor for a suitable residence time. The residence time in the continuous process will, of course, vary within rather wide limits depending upon such variable as reaction temperature, pressure, the amount of catalyst used and the monomeric materials being polymerized. In a continuous process the residence time generally falls within the range of 1 second to 1 hour when conditions within the specified ranges are employed. When a batch process is being utilized, the time for the reaction can be as high as 24 hours or more, although it is generally less than 24 hours.

Upon completion of the polymerization period, the reaction mixture is treated in order to inactivate the catalyst and recover the polymer. It is generally preferred to add only an amount of catalyst deactivating material, such as water or an alcohol, which is sufficient to deactivate the catalyst. It has also been found advantageous to add an antioxidant such as phenyl - beta - naphthylamine, 2,2'-methylene-bis(4-methyl-6-tert-butylphenol), or the like to the polymer solution prior to removal of the diluent although it can be added after the polymer has been recovered. Polymers can be recovered from solution by distillation or evaporation of the diluent.

The liquid polymers produced in accordance with this invention have utility as coatings for surfaces such as metals, as plasticizers for rubbers, and they can be blended with carboxy- and hydroxy-terminated liquid conjugated diene polymers to lower the viscosity of the latter polymers.

A more comprehensive understanding of the invention can be obtained by referring to the following illustrative examples which are not intended, however, to be unduly limitative of the invention.

EXAMPLE I

A series of runs was conducted in which 1,3-butadiene was polymerized in the presence of a catalyst formed by mixing n-butyllithium and potassium tert-butoxide (the potassium salt of tert-butyl alcohol). A polar material, either water or oxygen, was present in some of the runs while other runs were made in the absence of a polar substance to serve as controls. Two different charging procedures were employed. Following is the polymerization recipe:

| | |
|---|---|
| 1,3-butadiene, parts by weight | 100 |
| Toluene, parts by weight | 1000 |
| n-Butyllithium (n-BuLi), mhm.[1] | variable |
| Potassium tert-butoxide (K-O-t-Bu), mhm. | 1.0 |
| Polar material, $H_2O$ or $O_2$, mhm. | variable |
| Temperature, °F. | 122 |
| Time, hours | 4 |

[1] Mhm.=millimoles per 100 grams monomer.

Charge Order:
  A—Toluene, $N_2$ purge, butadiene, polar material (when used), K-O-t-Bu, n-BuLi
  B—Toluene, $N_2$ purge, butadine, polar material (when used), n-BuLi, K-O-t-Bu At the conclusion of each polymerization, approximately one part by weight per 100 parts by weight of polymer of 2,2'-methylene-bis(4-methyl-6-tert-butylphenol) in isopropyl alcohol was blended with the polymer solution, after which the product was recovered by evaporation of the diluent. Results are presented in Table I.

group consisting of aliphatic, cycloaliphatic and aromatic radicals and $x$ is an integer from 1 to 4, inclusive; (b) an organic compound selected from the group consisting of compounds having the following formulas:

(1) R'M
(2) R'(YM)$_n$
(3) 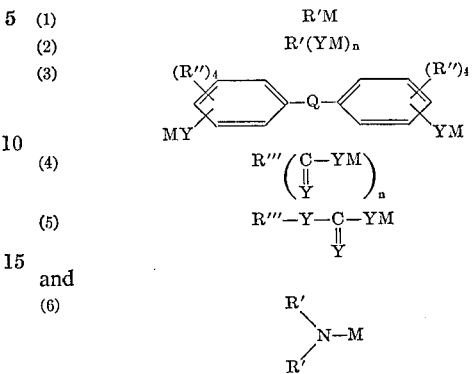
(4)
(5)
and
(6)

wherein R' is selected from the group consisting of aliphatic, cycloaliphatic and aromatic radicals, M is an alkali metal selected from the group consisting of sodium, potassium, rubidium and cesium, R" is selected from the group consisting of hydrogen and aliphatic, cycloaliphatic and aromatic radicals, Q is selected from the group consisting of

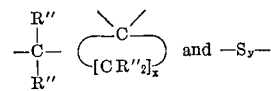 and $-S_y-$

TABLE I

| Run No. | n-BuLi, mhm. | Polar Material | | Polar Material/ BuLi, mole ratio | Charge Order | Conv., Percent | Brookfield Visc. | |
|---|---|---|---|---|---|---|---|---|
| | | Type | mhm. | | | | Poise | Temp., °F. |
| 1 | 1.5 | | | | A | 100 | 169 | 77 |
| 2 | 1.5 | $H_2O$ | 0.5 | 0.33/1 | A | 100 | 5.6 | 77 |
| 3 | 1.5 | $O_2$ | 0.5 | 0.33/1 | A | 100 | 10 | 77 |
| 4 | 1.5 | $H_2O$ | 0.5 | 0.33/1 | B | 100 | 12 | 77 |
| 5 | 1.5 | $O_2$ | 0.5 | 0.33/1 | B | 100 | 29 | 77 |
| 6 | 1.5 | | | | B | 100 | 72 | 73 |
| 7 | 1.5 | $H_2O$ | 0.25 | 0.17/1 | B | 100 | 31 | 73 |
| 8 | 1.0 | | | | B | 100 | 68 | 73 |

The lowest molecular weight polymer was obtained in Run 2, in which charge order A was used. The data show that a drastic reduction in molecular weight of the polybutadiene, as evidenced by a reduction in Brookfield viscosity, can be achieved by the presence of either water or oxygen in the polymerization system. These low molecular weight products are produced at relatively low catalyst levels. The fact that water has a specific action other than merely inactivating butyllithium is demonstrated by comparing viscosities of polymers in Runs 4 and 8. Products from Runs 6 and 8 have similar viscosities while that from Run 4 is very low.

As will be evident to those skilled in the art, many variations and modifications can be practiced upon consideration of the foregoing disclosure. Such variations and modifications are clearly believed to be within the spirit and scope of the invention.

I claim:
1. A process for preparing conjugated diene polymers which comprises contacting a monomeric material selected from the group consisting of (1) at least one conjugated diene and (2) a mixture of a conjugated diene and a vinyl-substituted aromatic hydrocarbon in which said vinyl group is attached to a nuclear carbon atom, with a catalyst which forms on mixing materials consisting essentially of (a) from 0.25 to 25 equivalents (based on lithium atoms) per equivalent of organic compound (b) of an organolithium compound having the formula $R(Li)_x$ wherein R is a hydrocarbon radical selected from the radicals where R" is as defined before, $x$ is an integer from 4 to 5, inclusive, and $y$ is an integer from 1 to 3, inclusive, R'" is selected from the group consisting of aliphatic, cycloaliphatic and aromatic radicals, Y is selected from the group consisting of oxygen and sulfur, and $n$ is an integer from 1 to 3, inclusive; and (c) from 0.05 to 0.7 moles per gram atom of lithium; a polar material selected from the group consisting of oxygen, water, and alcohols, primary amines and secondary amines containing from 1 to 20 carbon atoms per molecule, said contacting occurring at a temperature in the range of −80 to 150° C. in the presence of a diluent comprising at least 30 weight percent of an alkyl-substituted aromatic hydrocarbon.

2. A process according to claim 1 in which said monomeric material is 1,3-butadiene.

3. A process accordin gto claim 1 in which said monomeric material is isoprene.

4. A process according to claim 1 in which said monomeric material is a mixture of 1,3-butadiene and styrene.

5. A process according to claim 1 in which said monomeric material is a mixture of isoprene and styrene.

6. A process according to claim 1 in which said monomeric material is a mixture of 1,3-butadiene and 3-methylstyrene.

7. A process for preparing conjugated diene polymers which comprises contacting in a polymerization zone a monomeric material selected from the group consisting of (1) at least one conjugated diene containing from 4 to 12 carbon atoms per molecule and (2) a mixture of a conjugated diene containing from 4 to 12 carbon atoms per molecule and a vinyl-substituted aromatic hydrocarbon in which said vinyl group is attached to a nuclear carbon atom with a catalyst which forms on mixing (a) from 0.25 to 25 equivalents (based on lithium atoms) per equivalent of organic compound (b) of an organolithium compound having the formula $R(Li)_x$ wherein R is a hydrocarbon radical selected from the group consisting of aliphatic, cycloaliphatic and aromatic radicals containing from 1 to 20 carbon atoms and $x$ is an integer from 1 to 4, inclusive; (b) an organic compound selected from the group consisting of compounds having the following formulas:

(1) R'M
(2) R'(YM)$_n$
(3) 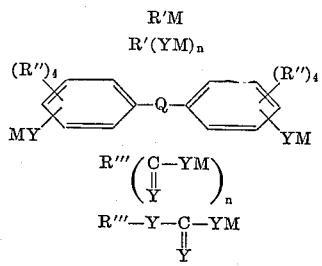
(4) 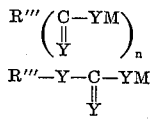
(5) R'''—Y—C—YM
     $\|$
     Y and (6) 

wherein R' is selected from the group consisting of aliphatic, cycloaliphatic and aromatic radicals containing from 1 to 20 carbon atoms, M is an alkali metal selected from the group consisting of sodium, potassium, rubidium and cesium, R'' is selected from the group consisting of hydrogen and aliphatic, cycloaliphatic and aromatic radicals containing from 1 to 6 carbon atoms, Q is selected from the group consisting of

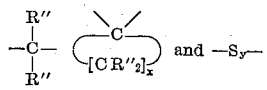

radicals, where R' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is selected from the group consisting of oxygen and sulfur, and $n$ is an integer from 1 to 3, inclusive; and (c) from 0.05 to 0.7 moles per gram atom of lithium; a polar material selected from the group consisting of oxygen, water, and alcohols, primary amines and secondary amines containing from 1 to 20 carbon atoms per molecule, said contacting occurring at a temperature in the range of —80 to 150° C. in the presence of a diluent comprising at least 30 weight percent of an alkyl-substituted aromatic hydrocarbon, and thereafter recovering a liquid conjugated diene polymer.

8. A process according to claim 7 in which the amount of said organolithium compound is in the range of 0.3 to 25 milliequivalents of organolithium compound per 100 parts by weight of monomeric material, the relative quantities of said organolithium compound and said organic compound are in the range of 0.25 to 25 equivalents of organolithium compound (based on lithium atoms) per equivalent of organic compound, and said contacting occurs at a temperature in the range of —20 to 80° C.

9. A process according to claim 7 wherein said polar material is present in the range of 0.05 to 0.7 mole per gram atom of lithium.

10. A composition which forms on mixing (a) from 0.25 to 25 equivalents (based on lithium atoms) per equivalent of organic compound (b) of an organolithium compound having the formula $R(Li)_x$ wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic compound selected from the group consisting of compounds having the following formulas:

(1) R'M
(2) R'(YM)$_n$
(3) 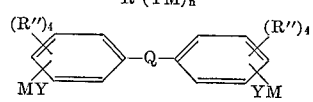
(4) 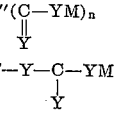
(5) R'''—Y—C—YM
     $\|$
     Y and (6) 

wherein R' is selected from the group consisting of aliphatic, cycloaliphatic and aromatic radicals containing from 1 to 20 carbon atoms, M is an alkali metal selected from the group consisting of sodium, potassium, rubidium and cesium, R'' is selected from the group consisting of hydrogen and aliphatic, cycloaliphatic and aromatic radicals containing from 1 to 6 carbon atoms, Q is selected from the group consisting of

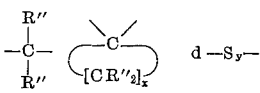

radicals where R' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is selected from the group consisting of oxygen and sulfur, and $n$ is an integer from 1 to 3, inclusive; and (c) from 0.05 to 0.7 mole per gram atom of lithium; a polar material selected from the group consisting of oxygen, water, and alcohols, primary amines and secondary amines containing from 1 to 20 carbon atoms per molecule.

11. A catalyst composition which forms on mixing materials consisting of essentially of n-butyllithium, potassium tert-butoxide, and water.

12. A catalyst composition which forms on mixing materials consisting essentially of n-butyllithium, phenylsodium, and water.

References Cited

UNITED STATES PATENTS

| | | | |
|---|---|---|---|
| 2,692,255 | 10/1954 | Kreider | 260—94.2 |
| 3,177,190 | 4/1965 | Hsieh | 260—93.5 |
| 3,208,988 | 9/1965 | Forman et al. | 260—94.2 |

FOREIGN PATENTS

| | | |
|---|---|---|
| 1,129,700 | 5/1962 | Germany. |

OTHER REFERENCES

Chemical Abstract, vol. 52, January and February 1958, page 3386.

DELBERT E. GANTZ, *Primary Examiner.*

JAMES A. SEIDLECK, *Examiner.*

C. R. DAVIS, *Assistant Examiner.*